UNITED STATES PATENT OFFICE.

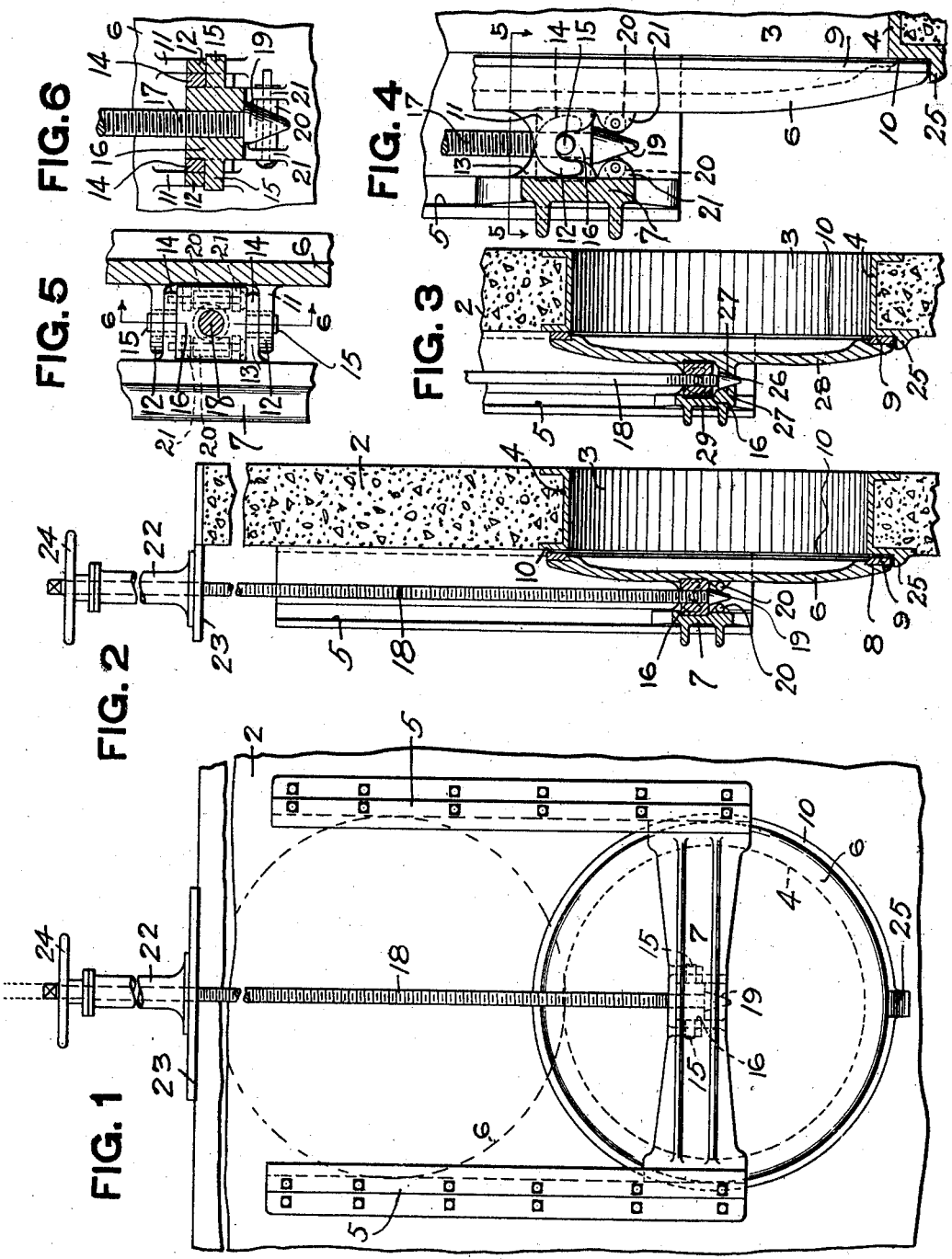

FREDERICK B. LEOPOLD, OF SEWICKLEY, PENNSYLVANIA.

SLUICE-GATE.

983,297.          Specification of Letters Patent.          Patented Feb. 7, 1911.

Application filed March 11, 1910. Serial No. 548,712.

*To all whom it may concern:*

Be it known that I, FREDERICK B. LEOPOLD, a resident of Sewickley, in the county of Allegheny and State of Pennsylvania, have invented a new and useful Improvement in Sluice-Gates; and I do hereby declare the following to be a full, clear, and exact description thereof.

My invention relates to sluice gates.

The object of my invention is to provide a construction by means of which the sluice gate is forced into contact with its seat with equal force substantially at all points.

To these ends my invention comprises the novel features hereinafter set forth and claimed.

In the drawing Figure 1 is a face view of my improved sluice gate in closed position; Fig. 2 is a side sectional elevation showing the gate closed but not forced to its seat; Fig. 3 is a modified form of my invention showing the gate forced to its seat; Fig. 4 is an enlarged side view partly in section of the construction shown in Fig. 2; Fig. 5 is a cross section on the line 5—5 Fig. 4; Fig. 6 is a section on the line 6—6 Fig. 5; and Fig. 7 is a modified form of my invention.

In the drawing the numeral 2 designates the wall of a reservoir such as employed in connection with a filtration plant which is supplied with the outlet 3 encircled with the casing 4 embedded in the concrete of the wall 2. At the sides of the opening 3 are the guides 5 which guide the gate 6 and the cross-member 7. The gate 6 is provided around its outer edge with the seat 8 to receive the bronze or like metal gasket 9 which is adapted to be forced against the seat 10 of the casing 4 to make a tight joint. The gate 6 is formed with the lugs 11 having the hooked portions 12. The cross-member 7 is provided with like lugs 13 with hooked portions 14. The hooked portions of the lugs 11 and 13 engage the trunnions 15 which extend from opposite sides of the nut 16. The nut 16 is engaged by the threaded portion 17 of the stem 18. At the lower end of the stem 18 is the wedge or conical portion 19 which is adapted to engage the idle rollers 20 journaled in the lugs 21 on the gate 6 and cross-members 7. These lugs are arranged central, or substantially so, of the gate so that when the pressure is applied the said pressure will be central of the gate.

The upper end of the stem 18 passes up through the stand 22 mounted on the plate 23 on the wall 2 and on said stand is the hand wheel 24 for raising and lowering the valve stem 18 all in the ordinary manner.

In the operation of my improved valve, when it is desired to raise the same the wheel 24 is turned and the gate 6 together with the cross-member 7 is raised in the guides 5 until the gate has been opened the desired amount. When it is desired to close the gate, the operator by turning the handle 24 lowers the gate and cross-member 7, and when said gate comes in contact with the stop 25 on the casing 4 further downward movement of the gate is prevented and the gate is then forced to its seat in the position indicated in Fig. 3 by further turning of the valve stem 18. This additional movement of the valve stem forces the wedge or conical portion 19 down between the rollers 20 and the action of said wedge is to force the gate 6 and cross-member 7 apart, and as said gate and cross-member are retained by the guides 5, said gate 6 is forced against the seat 10 and held firmly in contact therewith forming a secure and tight joint. By having the wedge engaging the gate and cross-member at points in line with the center of the gate the gate is forced against its seat at substantially all points with equal force so that there is no opportunity for the gate to spring at any particular point to cause leakage. The valve is simple in construction and the parts are strong and durable so that said sluice gate possesses great durability.

In Fig. 3 I have illustrated a modified form of my invention in which the rollers 20 are omitted and the conical or wedge portion 26 engages the inclined faces 27 on the gate 28 and cross-member 29.

In Fig. 7 I have illustrated my invention as applied to a valve stem which remains stationary while the nut travels up and down on the stem. In this case the numeral 30 represents the valve stem and 31 the nut. This nut has the conical portion 32 which is adapted to engage the inclined faces 33 of the gate 34 and the cross member 35. When the valve stem is turned, the nut moves up and down and when the gate reaches the stop, the further movement of the stem will force the nut 31 downwardly to force the gate and cross member apart.

What I claim is:

1. In a sluice gate, the combination of a seat, guides, a gate engaging said guides, a cross-member engaging said guides, a threaded valve stem, a solid nut engaged directly by said valve stem, and said gate and cross-member engaging said nut independently of each other, and means for forcing said gate and cross-member in opposite directions.

2. In a sluice gate, the combination of guides, a gate and a cross-member engaging said guides, a valve stem, a nut engaged thereby, trunnions on said nut, hooked portions on said gate, a cross-member engaging said trunnions, and means for forcing said gate and cross-member in opposite directions.

3. In a sluice gate, the combination of a seat, guides, a gate and cross-member engaging said guides, a valve stem, a solid nut engaged thereby, said gate and said cross-member engaging said nut, and a wedge on said valve stem adapted to force said gate and cross-member in opposite directions.

4. In a sluice gate, the combination of a seat, guides, a gate and a cross-member engaging said guides, a valve stem, a nut carried thereby, said gate and cross-member engaging said nut, and a wedge carried by said stem and rollers on said gate and cross-member with which said wedge engages.

5. In a sluice-gate, the combination of a seat, guides, a gate and a cross-member engaging said guides, a threaded valve-stem, a solid nut carried thereby, said gate and cross-member engaging said nut, and a wedge carried by said stem and engaging points on said gate and cross-member central of said gate.

In testimony whereof, I the said FREDERICK B. LEOPOLD have hereunto set my hand.

FREDERICK B. LEOPOLD.

Witnesses:
ROBERT C. TOTTEN,
JOHN F. WILL.